United States Patent [19]

Ner-Gaon

[11] Patent Number: 5,623,765
[45] Date of Patent: Apr. 29, 1997

[54] FEED-OUT MECHANISM FOR ROTARY MOWER CUTTING HEAD

[76] Inventor: Shimon Ner-Gaon, 6 Remez Street, Bat Yam, Israel

[21] Appl. No.: 569,563

[22] Filed: Dec. 8, 1995

Related U.S. Application Data

[63] Continuation of Ser. No. 106,371, Aug. 13, 1993, abandoned.

[30] Foreign Application Priority Data

Aug. 20, 1992 [IL] Israel .................................... 102.887

[51] Int. Cl.⁶ .................................................. A01D 50/00
[52] U.S. Cl. .................................. 30/276; 30/347; 56/12.7
[58] Field of Search ............................ 30/276, 296.1, 30/347; 56/12.1, 12.7, 17.5

[56] References Cited

U.S. PATENT DOCUMENTS

| | | | |
|---|---|---|---|
| 4,134,204 | 1/1979 | Perdue | 30/276 |
| 4,161,820 | 7/1979 | Moore | 30/276 |
| 4,167,812 | 9/1979 | Moore | 56/12.7 X |
| 4,236,309 | 12/1980 | Cayou | 30/276 |
| 4,236,311 | 12/1980 | Mitchell | 56/12.7 X |
| 4,245,454 | 1/1981 | Zien | 30/276 X |
| 4,259,782 | 4/1981 | Proulx | 56/12.7 X |
| 4,274,201 | 6/1981 | Oberg et al. | 56/12.7 X |
| 4,276,691 | 7/1981 | Palmieri et al. | 30/347 |
| 4,584,771 | 4/1986 | Tillotson | 30/347 X |
| 4,656,739 | 4/1987 | Pittinger, Jr. | 30/276 |
| 4,672,798 | 6/1987 | Ota | 30/276 X |

Primary Examiner—Rinaldi I. Rada
Assistant Examiner—Raymond D. Woods
Attorney, Agent, or Firm—Abelman, Frayne & Schwab

[57] ABSTRACT

An improved flail release mechanism in rotary mowers heads, to be used for all kinds of vegetation, has a head of which has a flattened part to improve the engagement with the ground, and a release mechanism which comprises a ring member so designed to enable the release of different lengths of flail.

7 Claims, 5 Drawing Sheets

1

FEED-OUT MECHANISM FOR ROTARY MOWER CUTTING HEAD

This application is a Continuation application under 37 C.F.R. 1.62 of prior application Ser. No. 08/106,371, filed on Aug. 13, 1993, now abandoned.

FIELD AND BACKGROUND OF THE INVENTION

The present invention relates to rotary mower cutting heads with flexible cutting heads and more particularly to improvements in the mechanism which releases the cutting blades out of the housing.

The use of rotary cutting heads has become very popular amongst professionals and domestic users, due to various reasons, such as, light weight, easy to handle, small size etc.

There are a fairly large number of such cutters and trimmers and patents which relate to improvements in these devices, such as:

U.S. Pat. Nos. 5,020,223, 4,959,904, 4,167,812, 4,151,646, 4,419,822, 4,189,833, 4,236,309, 4,412,382, 4,458,419, 4,183,138, 4,168,572, 4,145,809, 4,942,662 and 4,161,820.

As the present invention relates to the feedout mechanism of the cutting blades, which are in a form of flexible cord like flails, reference should be made to U.S. Pat. Nos. 4,203,212 and 4,259,782.

All above mentioned patents are operated in the same manner, namely the use of flails and the step wise release of same. These patents relate to different parts and improvements in such mowers, therefore all of these mowers have a sort of bump or bulge which is adapted to engage the ground while working, in order to release the predetermined length of flail. Most of the mowers have a spool on which the flails is wound and which is mounted within the housing of the mower's head. When the cutting head is bumped against the ground, said spool makes a quarter turn and release that length of flail. The main driving shaft of the mower is connected to the spool, while the rest of the housing is stationary. A spring which applies pressure on the bumper is mounted also within the housing said driving shaft is connected to an engine or an electrical motor by means of a rigid or flexible shaft.

OBJECTS OF THE INVENTION

The above described contruction is a space consuming one, thus being the main object of the present invention to change the construction of the cutter's head, to flatten the bumper and to enable the release of shorter lengths of the flail.

It is a further object of the present invention to provide a flail feed-out mechanism which responds to a bump on the ground.

It is yet a further object of the present invention to provide a construction which would be as flat as possible.

Finally it is also an object of the invention to provide a mechanism which would release a predetermined length of flail.

SUMMARY OF THE INVENTION

According to the invention, there is provided a rotary mower's cutting head which comprises, a housing in which is mounted a spool on which is wound a flail, said spool is also a cover for said housing, said spool having an inner space adapted to accomodate the the release mechanism being a ring shaped member, there is further provided a helical spring and a central shaft of a non-round cross section which is connected to the releasing mechanism, in a step rotation manner.

SHORT DESCRIPTION OF THE DRAWINGS

The invention will now be described with reference to the attached drawings in which:

FIG. 1—is a sectional view of the cutting head according to the invention.

FIG. 2—is an exploded view thereof

FIG. 3—a perspective view of the releasing mechanism

FIG. 4—is a section thereof

FIG. 5—is an exploded view of the embodiment of the invention.

FIG. 6—is an exploded view of yet a further embodiment of the invention.

DETAILED DESCRIPTION OF THE INVENTION

Figure 1:
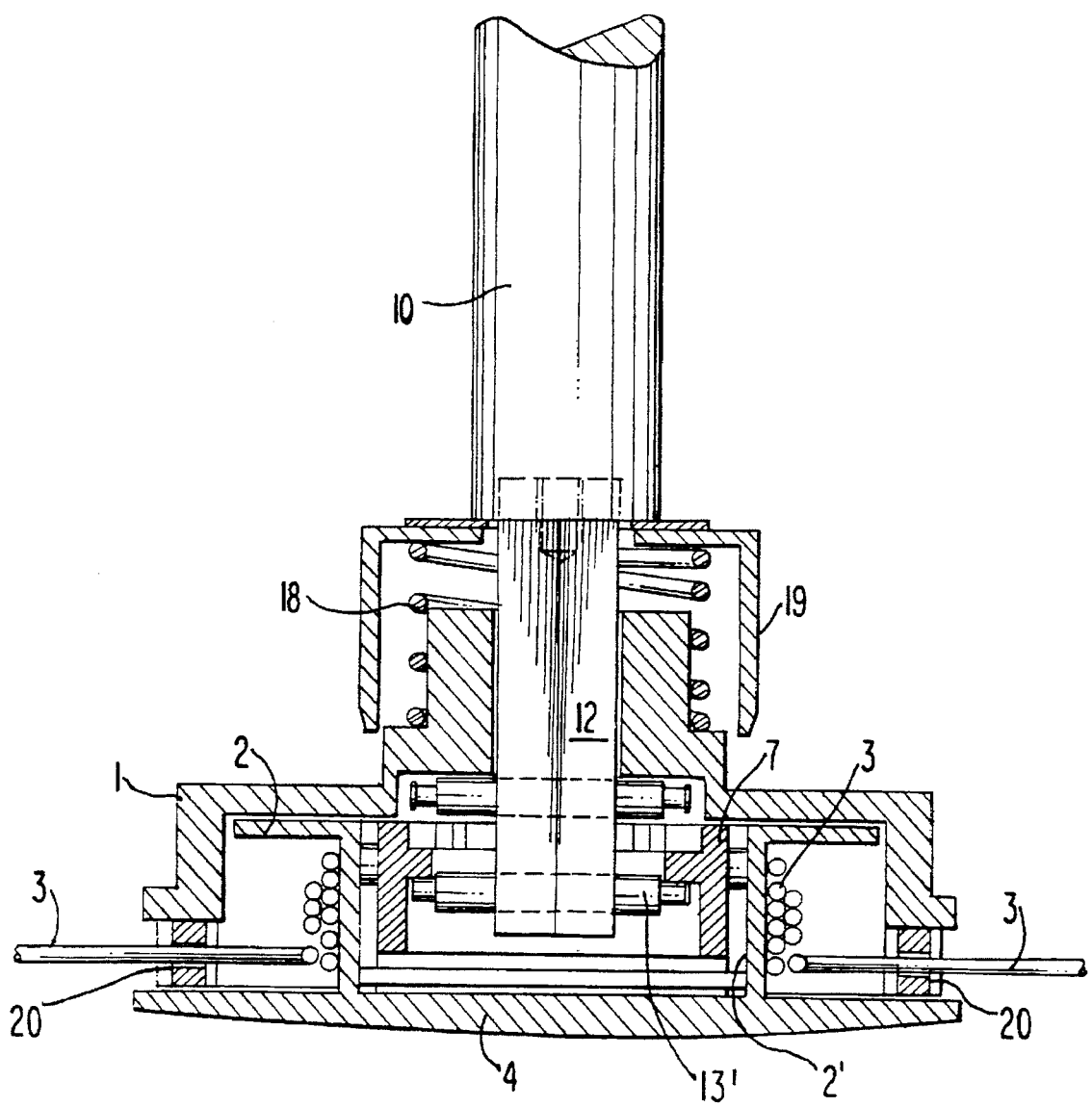
Figure 2:
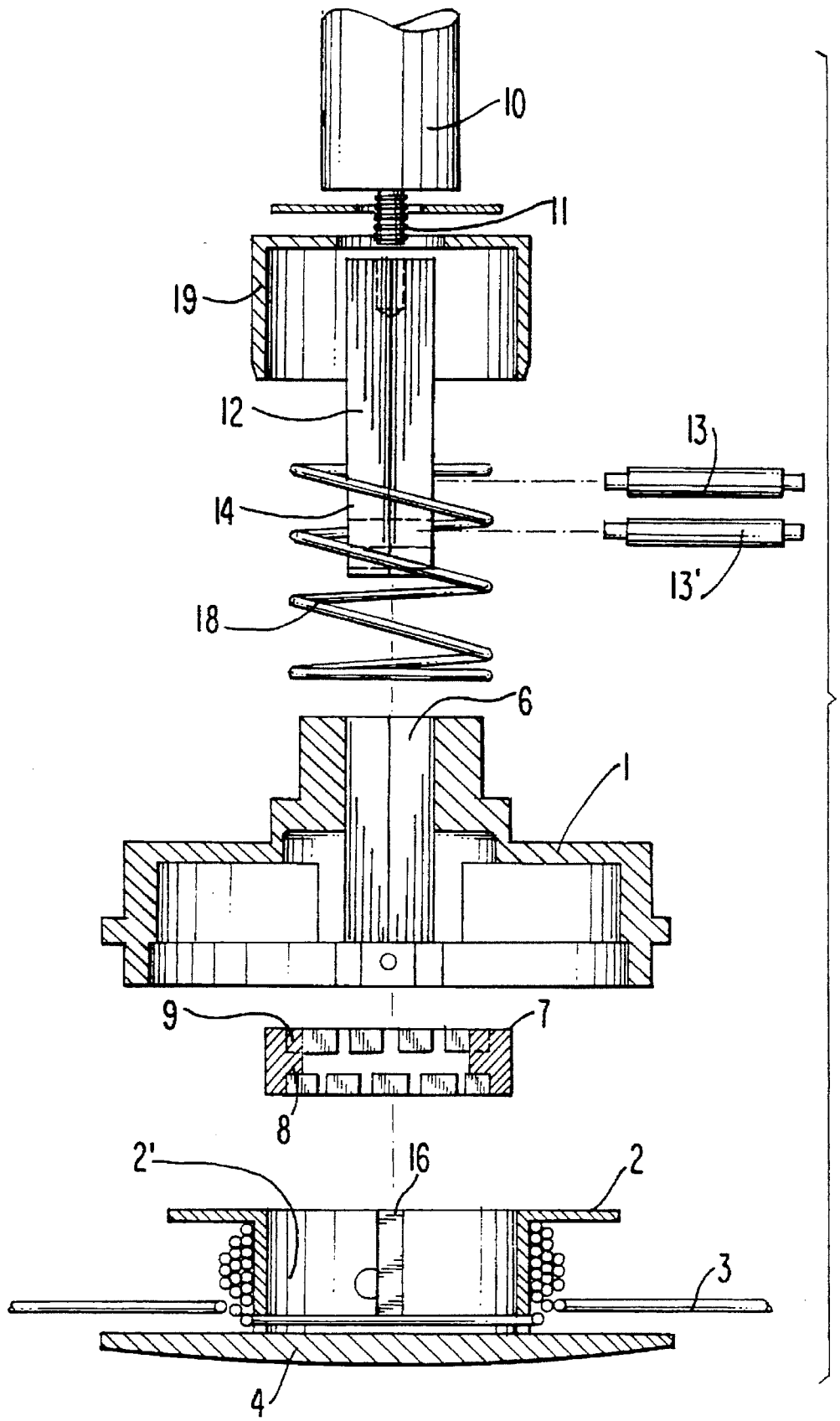
Figure 3:
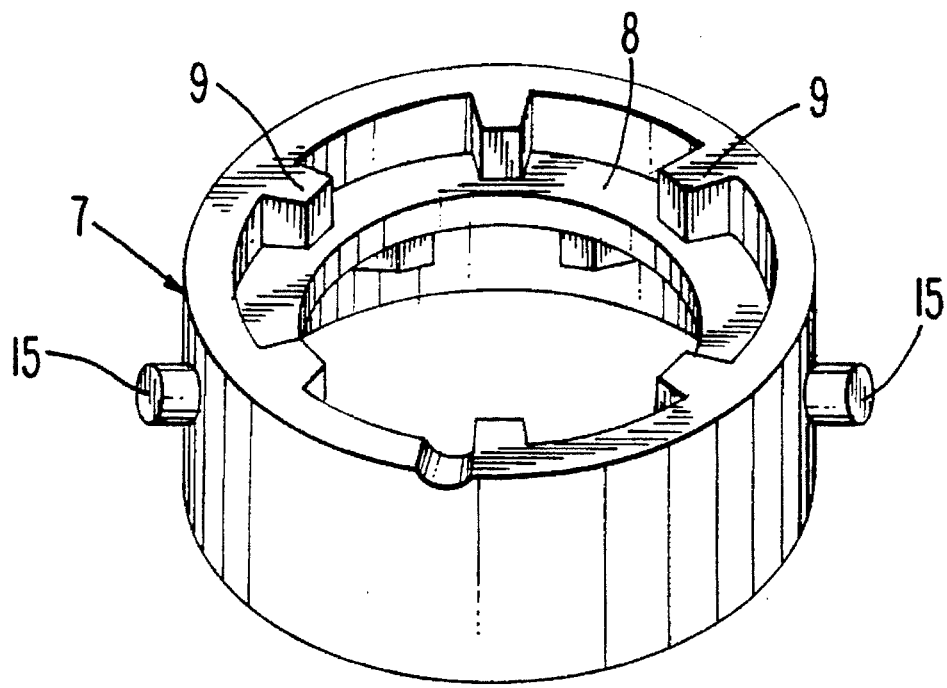
Figure 4:
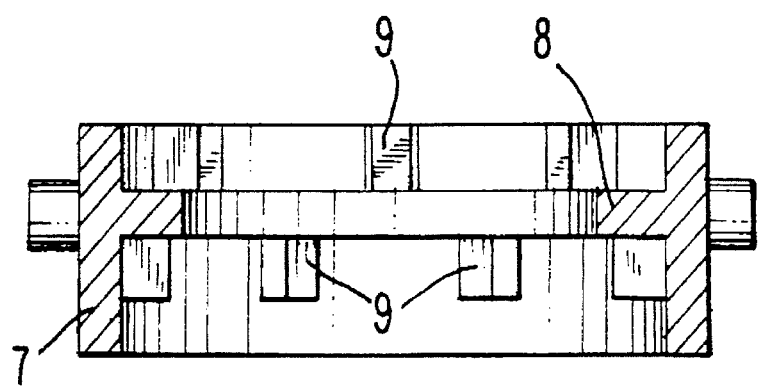

Turning first to FIGS. 1 and 2, the cutting head comprises a housing 1 and a spool 2 on which at least one flail 3 is wound. As can be seen the spool is not entirely concealed within housing 1, the outer wall 4 of the spool acts as a cover for housing 1 and is adapted to engage the ground when the mower is operated and when it is bumped on the ground to release a section of flail. Within space 2' of the spool there is provided a ring like shaped member 7 which is illustrated in detail in FIGS. 3 and 4. As can be seen, said ring member 7 is provided with an inner flange 8 and circumferential teeth like protrusions 9. There are provided two sets of such protrusions on both sides of said flange 8, the two sets being set-off one in relation to the other, so that one set is not in line with the second set. To the free end of the flexible driving shaft 10, there is connected by means of screw 11 a square or hexagon or other non-round cross section shaft means 12. Shaft 12 passes through opening 6 provided in housing 1. The cross section of said opening 6 corresponds with the cross section of shaft 12. Two pins 13 and 13' are inserted into two bores 14 provided in shaft 12 in such a manner that one pin is placed underneath flange 8 while the second pin extends above said flange. Ring member 7 is further provided with two short pins 15 which are placed within complementery slots 16 provided in spool 2 (see FIG. 5). Over housing 1 there is provided a helical spring 18 which applies pressure on the housing. The spring is held within an inverted cup like member 19.

Housing 1 is further provided with outlet holes 20 from which extend the flails 3. In the known cutting heads the spool moves axially within the housing. Contrary to the known arrangement the spool 2 is fixedly held within housing 1 when the cutting head is bumped against the ground the spool and housing move axially relative to shaft 12.

The release operation of a section of flail occurs in the following manner. Shaft 12 rotates the whole cutting head, as opening 6 matches the cross section of shaft 12. Spool 2 would rotate as pin 13' (the lower) is held in between the lower set of protrusions 9. When the cutter head is bumped against the ground the spool and housing would move axially against spring 18, ring member 7 would also move axially thus pin 13' would be disengaged from protrusions 9, consequently spool 2 would spin by inertia and release a short predetermined length of flail. Pin 13 would enter in between upper protrusions 9 and stop the inertial spin.

Spring 18 would return housing 1 and the spool to the initial starting position.

Figure 5:
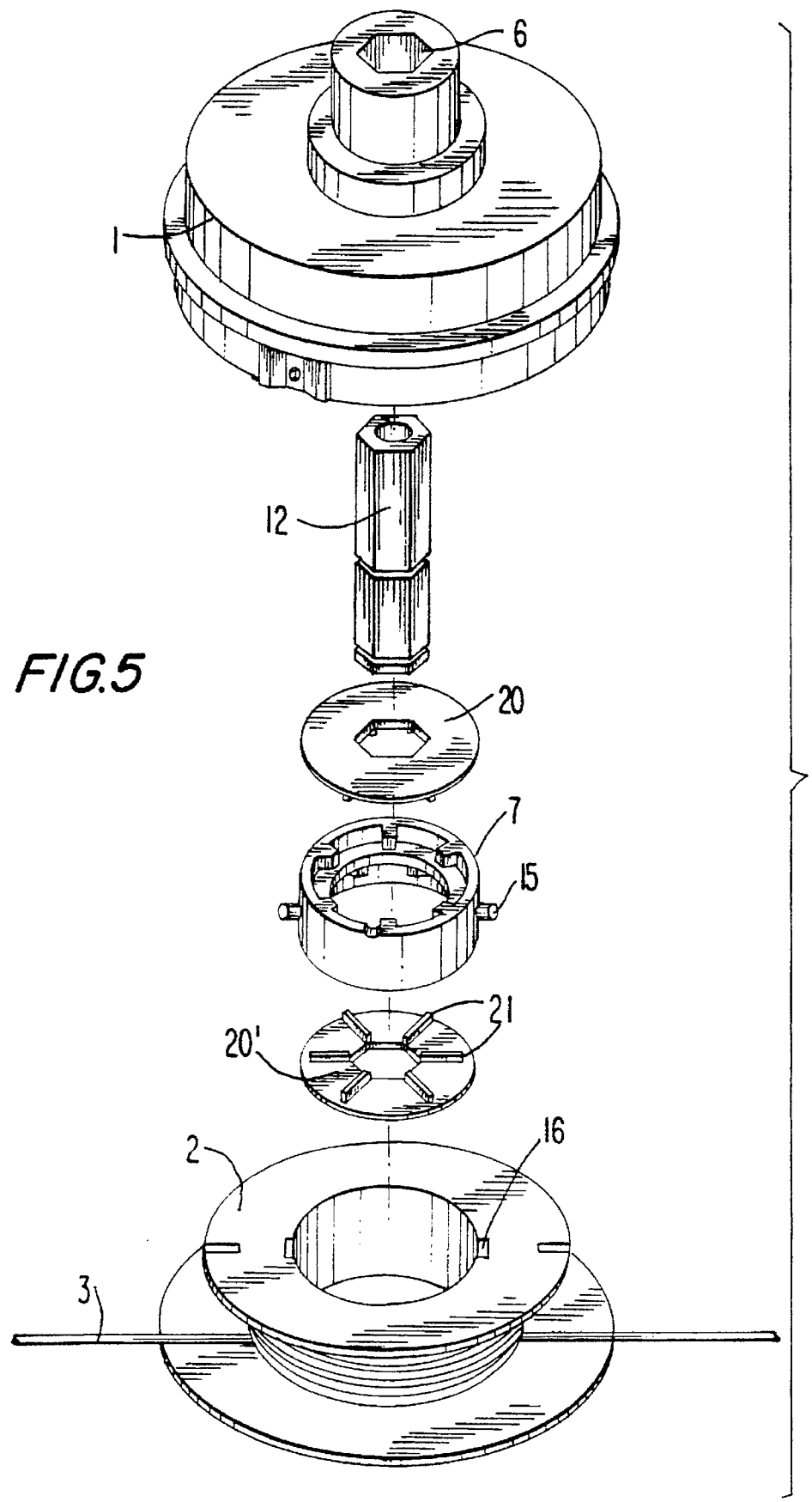

The embodiment shown in FIG. 5 functions in a similar manner, however instead of pins 13 and 13' there are provided two discs 20 and 20' said discs are provided with radial protrusions 21 which are adapted to fit in the space between the protrusions 8 and 9 of ring member 7.

Figure 6:
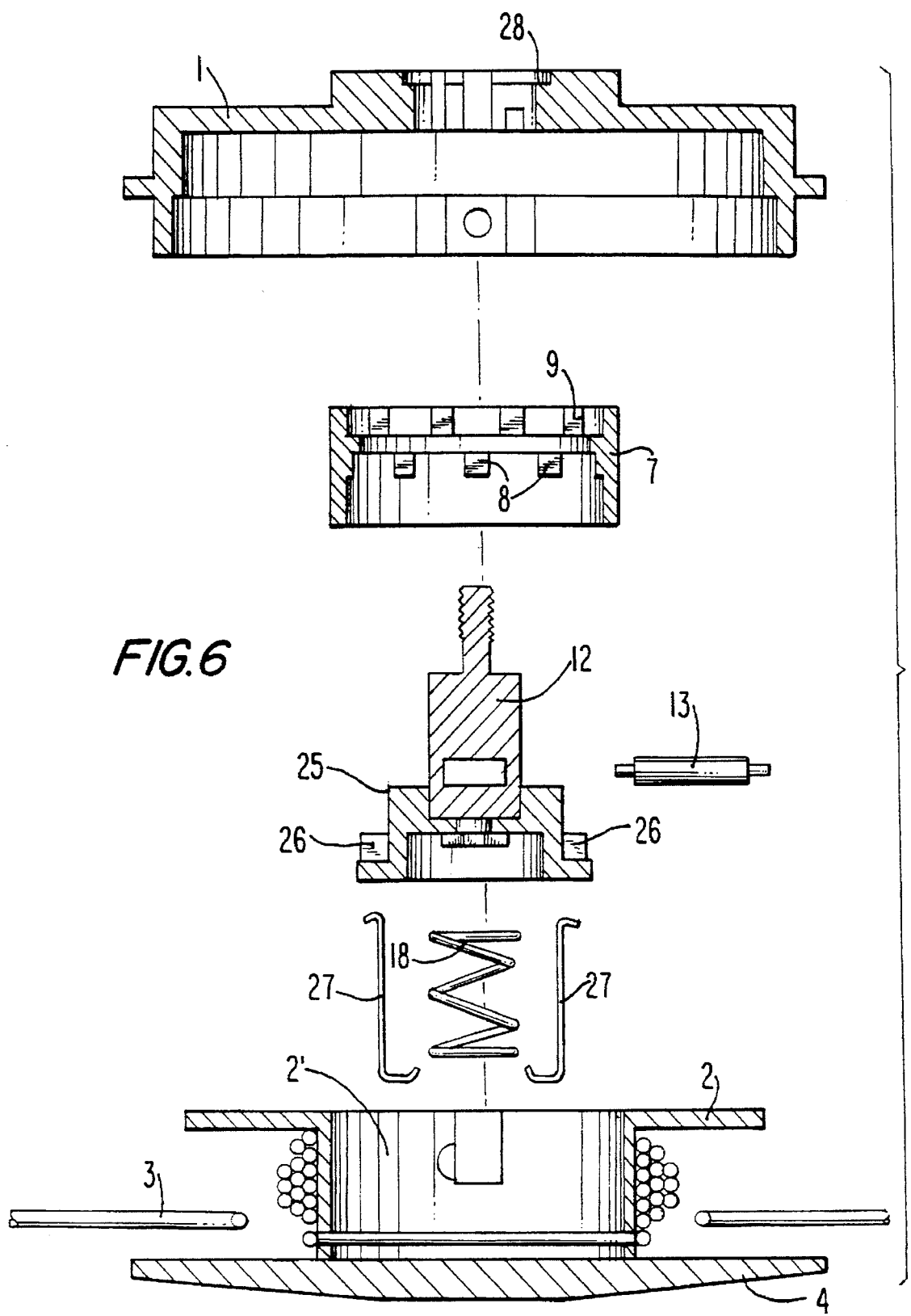

Yet a further embodiment is illustrated in FIG. 6 in an exploded manner. Again the device would function in the same manner as described above, however, instead of one of pins 13, a member 25 is fixedly connected to the free end of shaft 12 such that pin 13 is placed above flange 8 while member 25 would be thereunder. Member 25 is provided with protrusions 26 which fit into the space between protrusion 9. The spring 18 is placed underneath member 25 and held in position by two hook members 27, the lower end thereof engage spring 18 while the upper end rest on step 28 of housing 1 when being in the assembled position.

I claim:

1. A rotary mower cutting head which comprises a housing, said housing having an interior surface in which is mounted a spool on which is wound at least one flail, an outer wall of said spool is also a cover for said housing, said spool being axially stationary relative to said housing when a length of said at least one flail is released from said spool by a release mechanism, said spool having an inner space adapted to accommodate said release mechanism which comprises a ring shaped housing member, and there is further provided a helical spring placed on an exterior surface of said housing, and a control shaft of a non-round cross section which is connected to said release mechanism.

2. A rotary mower cutting head as claimed in claim 1, where said outer wall of said spool is substantially flat and is adapted to engage a surface when a mower of which said rotary mower cutting head is a part is operated.

3. A rotary mower cutting head as claimed in claim 1, where said ring shaped housing member comprises an internal circumferential flange and two sets of teeth, one set of said teeth on a first side of said flange and one set of said teeth on a second side of said flange.

4. A rotary mower cutting head as claimed in claim 3, where two pins are inserted into two bores provided in said shaft such that a first of said two pins is placed on said first side of said flange of said ring shaped housing member while a second of said two pins is placed on said second side of said flange.

5. A rotary mower cutting head as claimed in claim 1, where said release mechanism comprises two discs having radial protrusions.

6. A rotary mower cutting head as claimed in claim 1, where the cross section of said shaft corresponds with a cross section of an opening of said housing.

7. A rotary mower cutting head as claimed in claim 1, where said helical spring is concealed within a cup-shaped member comprising a cylindrical wall parallel to a longitudinal axis of said helical spring and an annular wall perpendicular to said cylindrical wall.

* * * * *